(12) United States Patent
Jayne

(10) Patent No.: US 6,289,868 B1
(45) Date of Patent: Sep. 18, 2001

(54) PLASMA IGNITION FOR DIRECT INJECTED INTERNAL COMBUSTION ENGINES

(76) Inventor: Michael E. Jayne, P.O. Box 482, Amherst, MA (US) 01004

( * ) Notice: Subject to any disclaimer, the term of this patent is extended or adjusted under 35 U.S.C. 154(b) by 0 days.

(21) Appl. No.: 09/501,788
(22) Filed: Feb. 11, 2000
(51) Int. Cl.[7] .................................................. F02B 19/00
(52) U.S. Cl. ........................ 123/260; 123/310; 123/637
(58) Field of Search ................................... 123/260, 261, 123/297, 143 B

(56) References Cited

U.S. PATENT DOCUMENTS

| | | |
|---|---|---|
| 2,795,214 * | 6/1957 | Shook .................................. 123/297 |
| 2,812,749 * | 11/1957 | Peters ................................... 123/297 |
| 4,096,841 | 6/1978 | Kindermann et al. . |
| 4,111,178 | 9/1978 | Casey . |
| 4,343,272 * | 8/1982 | Buck ..................................... 123/297 |
| 4,487,177 * | 12/1984 | Ishikawa ............................... 123/260 |
| 4,546,740 * | 10/1985 | Clements et al. ..................... 123/297 |
| 4,686,941 | 8/1987 | Ariga . |
| 4,913,111 | 4/1990 | Ariga . |
| 4,955,326 | 9/1990 | Helmich . |
| 5,076,223 | 12/1991 | Harden et al. . |
| 5,211,142 | 5/1993 | Matthews et al. . |
| 5,224,449 | 7/1993 | Fukano et al. . |
| 5,307,772 | 5/1994 | Rao et al. . |
| 5,429,103 | 7/1995 | Rich . |
| 5,497,744 * | 3/1996 | Nagaoda et al. ..................... 123/297 |
| 5,852,999 | 12/1998 | Chan . |
| 5,924,404 | 7/1999 | Ruman et al. . |

* cited by examiner

Primary Examiner—John Kwon
(74) Attorney, Agent, or Firm—Smith Patent Office

(57) ABSTRACT

An apparatus and method for the creation, placement and control of an area of electrical ionization within an internal combustion engine combustion chamber. This area of electrical ionization is positioned so that all of the fuel being injected into the combustion chamber must pass next to or through the area of electrical ionization to ensure that combustion has been initiated for all of the fuel as it is injected. This area of electrical ionization can be kept on as long as it is necessary to insure that the all of the fuel that is injected into the combustion chamber can be completely combusted. An engine equipped with this electrical ionization device has its fuel economy enhanced by timely, controlled, and complete combustion of all of the fuel injected into its combustion chamber. Furthermore, the pollutant emissions of both oxides of nitrogen and unburned hydrocarbons are reduced dramatically. Further, cold starting capability of this engine is greatly enhanced by a major reduction in the time necessary for the engine to warm up and a major reduction of pollutants created by the engine during the warm-up period. Additionally, this method of combustion also allows the engine to operate at a higher speed (rpm) allowing an increase in peak power output.

10 Claims, 12 Drawing Sheets

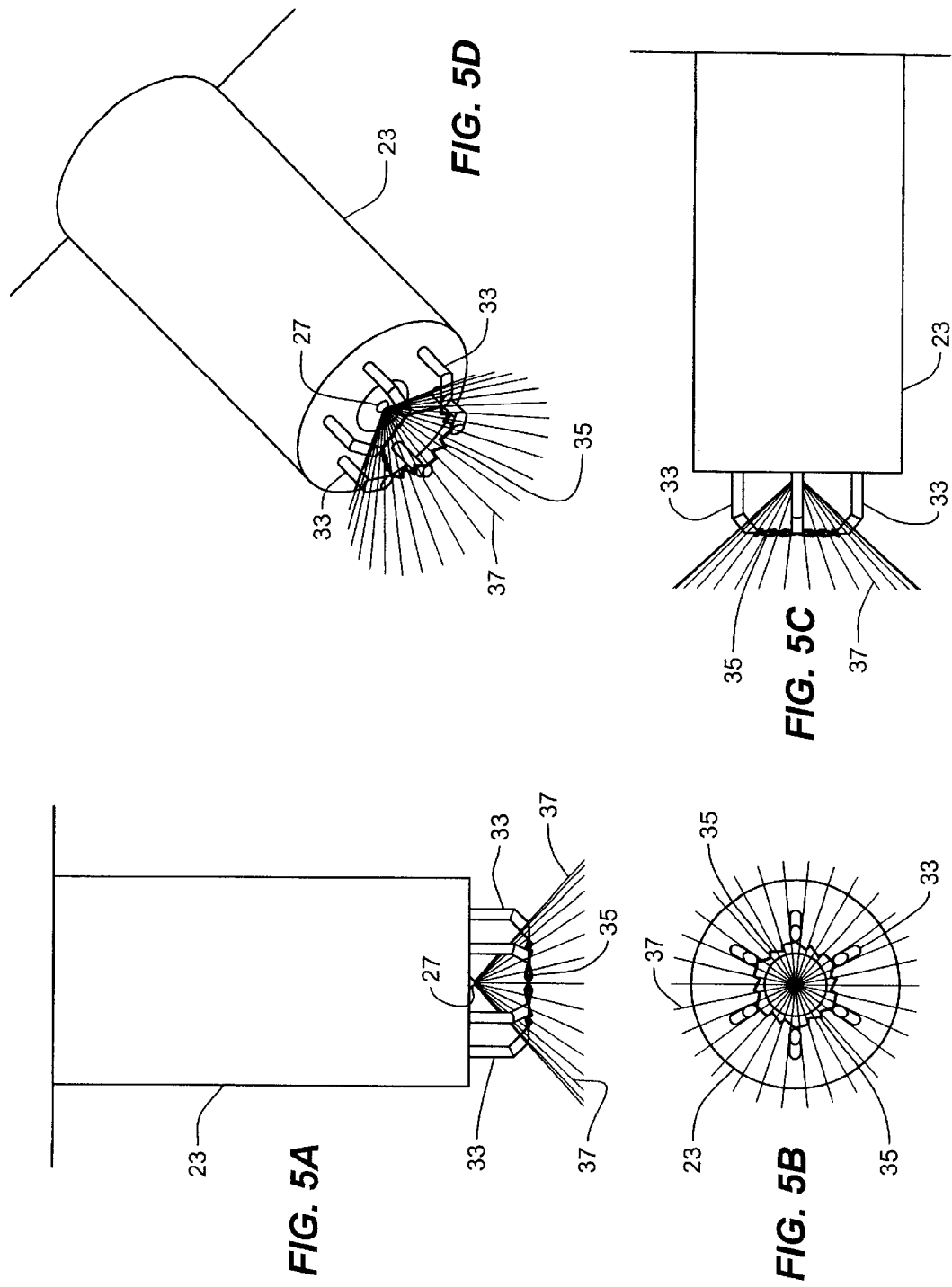

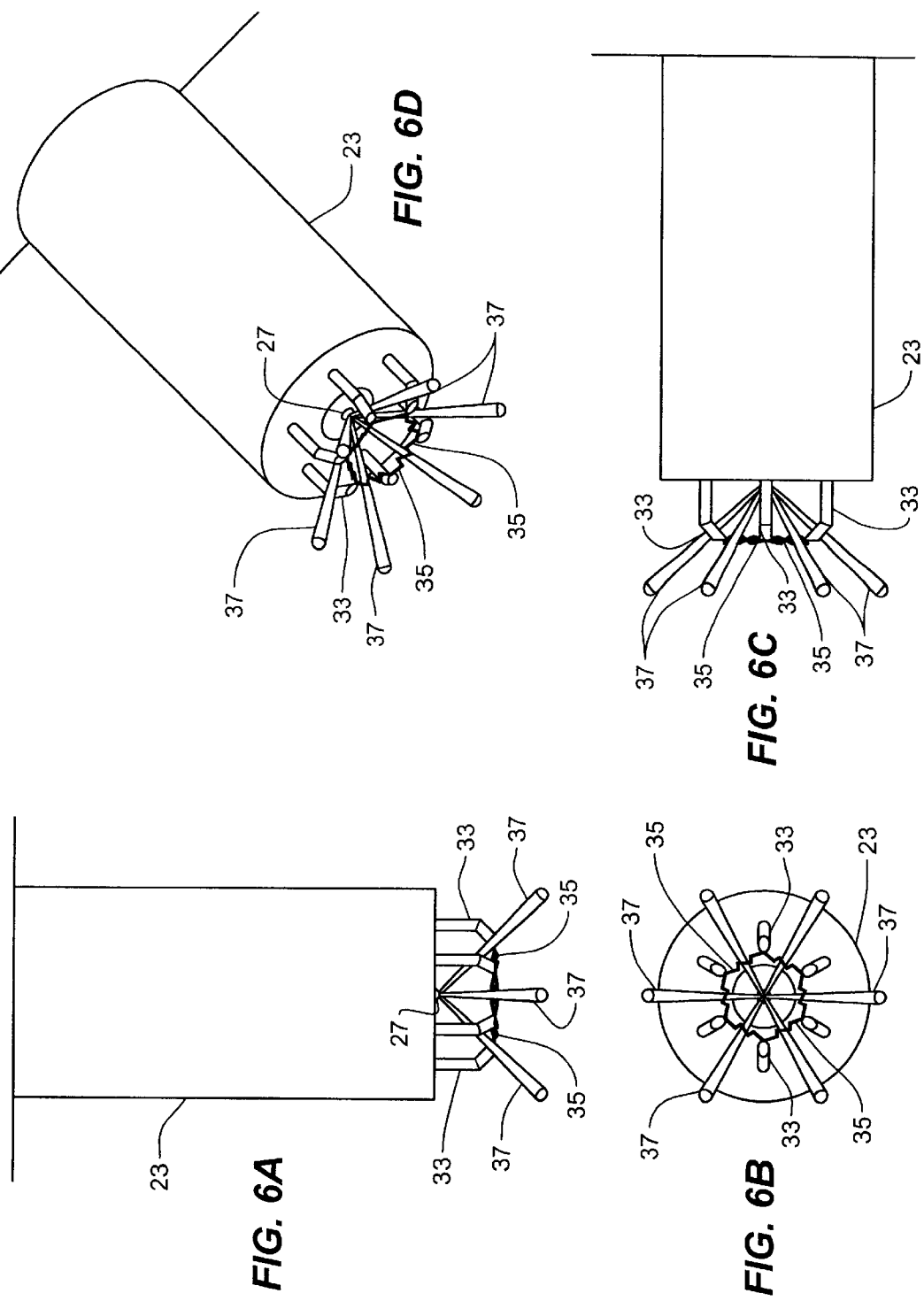

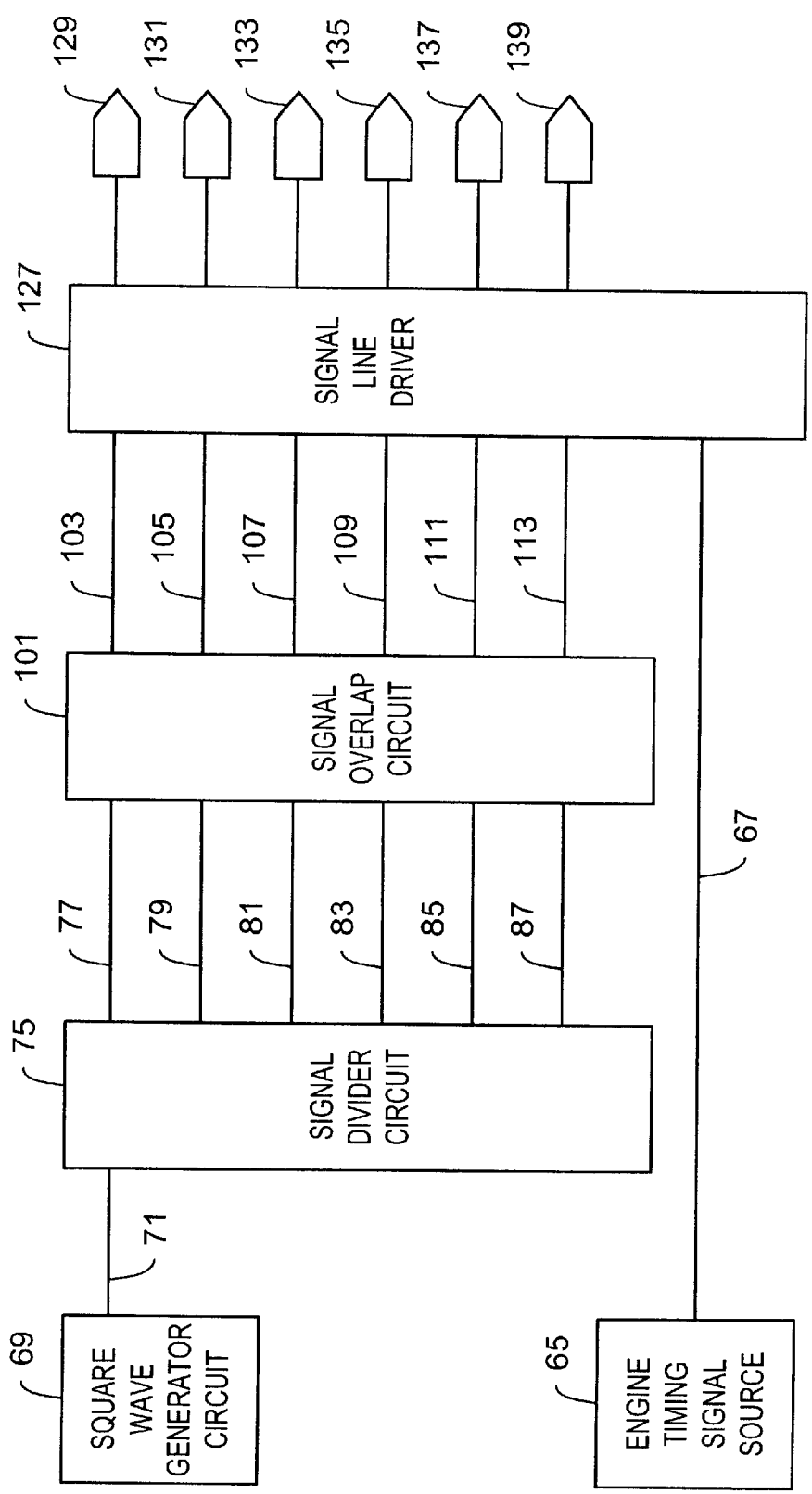

PLASMA IGNITION FOR DIRECT INJECTED INTERNAL COMBUSTION ENGINES

BACKGROUND OF THE INVENTION

1. Field of the Invention

The present invention relates to a method and apparatus for assuring combustion of fuel injected in a combustion chamber of an internal combustion engine.

2. Description of the Related Art

Diesel engines of both the 2-cycle and 4-cycle types have enormous acceptance throughout the world and they are also the types of engines that would benefit the most from application of the present invention. When engine longevity and fuel economy are more important than the power-to-weight ratio or the ability to operate through a wide range of engine speeds, diesel fueled engines are ideal.

Both Sir Harry R. Ricardo in his book *The High Speed Internal Combustion Engine* and Charles Fayette Taylor in his two volume set *The Internal Combustion Engine in Theory and Practice* states that once the piston in a diesel engine goes more than about one third of the way down on its power stroke, the flame in the combustion chamber goes out. Although diesel engines have much better fuel economy than that of gasoline engines of the same power output, the diesel engines fuel economy is still constrained by the time needed for complete combustion.

In an engine that is dependent upon the heat of compression to initiate and maintain combustion, the relatively slow process of fuel injection, mixing of the fuel with the air, and the combustion itself must take place before the flame goes out as the piston travels past the first third of its power stroke.

The primary cause of diesel engine pollution is its dependence upon the heat of compression inside the combustion chamber for initiation and maintenance of the combustion process. Regardless of engine rpm, the actual time (not degrees of crank rotation) that it takes for the fuel and air to mix and burn is relatively long because diesel fuel is notoriously hard to ignite and keep burning.

This difficulty of ignition can be demonstrated from putting out a match by dipping it in a cup of diesel fuel. This can also be demonstrated by placing a conventional spark plug in the fuel spray pattern of a fuel injector. When diesel fuel is injected into a spark plug's gap, the spark is extinguished there and the spark then takes place outside of the combustion chamber by taking a path outside of the spark plug ceramic insulator from its high voltage terminal to its threaded base. The difficulty of igniting diesel fuel with a spark plug is demonstrated further by the absence of spark assisted diesel engines from the market.

For the heat of compression in a diesel engine to be sufficient for the initiation of the combustion process, the compression ratio must be relatively high. In some engines this compression ratio is as high as 18 to 1. This results in a very high combustion chamber pressure even before the fuel is injected into the combustion chamber. Since combustion starts at an already high pressure, the combustion chamber temperature and pressure quickly increase to the point where the oxygen and nitrogen that are naturally present in air combine to create oxides of nitrogen (also referred to as NOx). Pollution from these oxides of nitrogen is the primary cause of acid rain, photo-chemical smog and a host of other very serious ecological and health problems.

The actual time needed for complete combustion to take place in a diesel engine is the primary cause of the other main type of pollutant emissions from diesel engine operation.

Any fuel that is not combusted or partially combusted as the piston goes down past a third of the way down its power stroke never gets burned. This problem becomes worse if the engine is operating at full speed (as measured in revolutions per minute) and/or at full power. Any partially or not combusted fuel left in the combustion chamber when the piston travels past the first third of the power stroke then exits through the exhaust port as unburned hydrocarbons, partially combusted hydrocarbons, and particulate matter, all of which together are more commonly referred to as smoke. Making this pollution even worse is the fact that the NOx created reacts with the water naturally present in engine exhaust to make nitric acid. This nitric acid then in turn reacts with the smoke to create a carcinogenic stew of truly unhealthy and dangerous chemicals. These chemicals are so harmful that under present Federal law, they could not be accepted by a landfill in the form of solid or liquid waste.

Until very recently, the only "pollution control device" that was installed on diesel engines in the United States was an engine speed governor. The function of this governor was to make sure that enough time was allowed during the power stroke so that sufficient combustion took place prior to the piston traveling past the first third of its power stroke in order to prevent the creation of visible smoke by the engine. All too often truck operators disable this governor so that they could squeeze a little extra power out of their engine while going up hill or passing other vehicles. Their ecological irresponsibility is evident from the enormous black clouds belching out of their exhaust stacks and left in their wake.

The Environmental Protection Agency (henceforth referred to as the EPA) has allowed until recently for diesel engines to be "grand-fathered" out of earlier pollution control regulations.

This was done for three reasons:

1. Diesel engines get much better fuel economy than gasoline engines of the same power output;
2. The currently accepted theory of operation for diesel engines did not allow for major changes in design that could be applied in a cost-effective manner; and
3. There was not any readily available alternative type of engine design that could perform the jobs currently done by diesel engines.

Over the last three decades this has resulted in a slower pace of design advancement for diesel engines, especially for pollution reduction, when compared to design advancements made on gasoline engines. As a result diesel engine design has improved only incrementally over the last thirty years without major reductions in pollutant emission levels.

During the same period of time, an outstanding job of cleaning up gasoline engines and other industrial sources of air pollution took place. However, air pollution created by diesel engines has remained about the same for a given amount of power produced. This caused the relative percentage of air pollution produced by diesel engines to become the primary cause of air pollution in the US.

In response to this, the EPA started looking into ways to reduce diesel engine pollutant emissions. They mentioned several possible means to achieve this in a fact sheet issued in October 1995 (EPA 420-F-95-009a) that included "after treatment" such as catalytic converters, fuel delivery control systems, air intake strategies, and changing diesel fuel formulations. This was followed in August 1998 by a *Regulatory Announcement—New Standards for Nonroad Diesel Engines* (EPA 420-F-98-034) that phase in reduction of diesel engine emissions by 66% over a ten year period.

Very specific procedures to verify regulatory compliance of new engine designs were put forward by the EPA in March 1999 in their document titled *Certification Guidance for Engines Regulated Under: 40 CFR Part 86 and 40 CFR Part 89*. Going through these procedures to get an engine certified are an enormous task in themselves and actually meeting these standards for EPA certification is a major accomplishment.

Over the years there has accumulated a large body of prior art that discloses a variety of approaches for providing assistance to the diesel engine combustion process. A variety of reasons have motivated these efforts, primarily to improve fuel economy, enhance engine power, and reduce pollutant emissions.

Rao et al. (U.S. Pat. No. 5,307,772) discloses a means to assist the diesel combustion process through the use of a catalyst. This catalyst is plated onto a structure that is placed between the pre-combustion chamber and the main combustion chamber in the cylinder head on a diesel engine. This catalyst-coated structure is positioned so that combusting gasses under high pressure and at high velocities must pass through it during each power stroke.

Fukano et al. (U.S. Pat. No. 5,224,449) and Ariga (U.S. Pat. Nos. 4,913,111 and 4,686,941) disclose improvements to spark-assisted diesel engines that consist of inducing turbulence to the combusting fuel-air mixture. In all three patents secondary combustion chambers are used to create the desired turbulence to enhance the mixing of the fuel and air. In addition to aiding the mixing process, the turbulence also exposes the spark on the tip of the spark plug to more of the fuel-air mixture. Although these systems may enhance combustion to some extent, the spark plug itself is only exposed to one specific point of the fuel-air mixture at any given time.

McCowen et al. (U.S. Pat. No. 5,855,192) discloses fuel-preheating elements, combustion chamber heating elements, and a heat retention element within the combustion chamber. The application of heat to the fuel and to the combustion chamber may assist the combustion process, especially during cold starting, as shown by the use of glow plugs and fuel pre-heaters in diesel engines currently in production; but there is a drawback to the introduction of additional heat into the combustion process in that it will result in greater creation of oxides of nitrogen. Another problem with this approach is the relative inefficiency of electrical resistance heating elements in terms of the power that they require, and their relatively short life in terms of total hours of operation after which they need to be replaced.

Chan (U.S. Pat. No. 5,852,999) discloses another example of creating and maintaining a spark that can be used in a spark assisted diesel engine. A two-point electrode arrangement is disclosed that is provided with a high frequency electrical current to create an electrical arc inside the combustion chamber. The main point in the disclosure by Chan is the concept of having the high frequency arc initiated while the piston in the combustion chamber is at bottom dead center of the compression stroke. This is done for the purpose of reducing the voltage needed to initiate the arc.

Casey (U.S. Pat. No. 4,111,178) and Kindermann et al. (U.S. Pat. No. 4,096,841) both disclose reciprocating 4-cycle direct injected spark ignited gasoline-fueled engines. The system disclosed consists of a fuel injector and a spark plug placed in a pre-combustion chamber with the spark timing controlled by a signal that originates in the fuel injector.

None of these references disclose an apparatus that will allow for the initiation of combustion for all of the fuel as it is injected into the combustion chamber followed by the maintenance of the combustion process to its completion in the manner described herein.

SUMMARY OF THE INVENTION

It is accordingly an object of the invention to provide an apparatus and method for assuring the combustion of the fuel injected into the combustion chamber of direct injected internal combustion engines such as diesel and gasoline engines of the reciprocating "piston in cylinder" type as well as gas turbines.

It is a further object of the invention to eliminate the dependence of diesel engines upon the heat of compression to initiate and maintain its combustion process.

It is a further object of the invention to improve the fuel economy of direct injected engines.

According to these objects of the present invention, an area of ionizing electrical energy (for purposes of illustration it is referred to as a "Ring-of-Fire") is created inside the combustion chamber directly in front of or adjacent to the fuel injector nozzle which the fuel must pass through or next to as it enters the combustion chamber. Additionally this Ring-of-Fire will be kept on as long as needed so that the present invention will provide a means for the immediate, controlled, and complete combustion of all of the fuel injected into an engine combustion chamber.

When used in a reciprocating internal combustion engine, the engine can completely combust its fuel earlier in the power stroke, resulting in an improvement of fuel economy. There are at least four reasons for this improvement in fuel economy (the first two are discussed in greater detail later):
1. Assuring the complete combustion of the fuel inside the combustion chamber, when and where it does the work rather than wasting it by allowing un-combusted and partially combusted fuel to escape out through the exhaust port;
2. Avoiding the endothermic chemical reaction that creates oxides of nitrogen (NOx);
3. Reducing pumping losses when an engine equipped with the present invention is operating at less than full power. This is especially important for automotive diesels since they spend much more of their operating time cruising at partial power or idling than they do at full power. The only time that an automotive diesel engine is run at full power is when the vehicle is either going up hill or being accelerated. Since the present invention assures combustion regardless of pressure, pumping losses can be reduced by throttling the air entering the intake manifold;
4. Improving the effective ratio of expansion during the engine power stroke. An engine equipped with the present invention has the fuel burn completed earlier in its power stroke, thus improving the effective ratio of expansion which improves thermal efficiency.

It is also an object of the present invention to improve the power output available from direct injected internal combustion engines such as diesel engines. Accordingly, engines so equipped can be run at full power while still completely combusting all of the injected fuel much more rapidly within the combustion chamber allowing for higher engine speed without creating unacceptable exhaust emissions. This higher peak engine speed, as measured in revolutions per minute (rpm), translates directly into a higher peak horsepower.

An additional object of the present invention is to reduce the pollutant emissions created by the operation of direct injected internal combustion engines. Although most of the direct injected engines in the world today are diesels, the present invention will provide these same benefits to gasoline and alternative fueled engines as well.

Hydrocarbon pollutant emissions are greatly reduced by the complete and timely combustion of the fuel and air within the engine's combustion chamber. By keeping the Ring-of-Fire on as long as needed, complete combustion inside the combustion chamber is assured which will improve fuel economy in addition to reducing hydrocarbon emissions.

Due to this ability of the present invention to assure complete combustion of all of the fuel inside the combustion chamber, engines so equipped will produce much fewer hydrocarbon emissions during a cold start before the engine has run long enough to warm up. This will avoid the creation of what the EPA refers to as the "hydrocarbon bubble" during warm-up of the engine, which is an area of pollution control that they are especially interested in.

The creation of oxides of nitrogen (NOx) will also be reduced significantly, especially in diesel engines, by the use of the present invention. Engines so equipped are freed from their dependence upon the heat of compression to initiate and maintain the combustion process. As a result of this, diesel engines equipped with the present invention will dramatically reduce the creation of NOx in three ways:
1. The mechanically defined compression ratio can be reduced without unacceptably degrading performance;
2. The timing of the initiation of fuel injection can be retarded in terms of degrees of crankshaft rotation without unacceptably degrading performance;
3. The rate of injection can be controlled by a closed-loop feedback system such as an engine management computer responding in real-time to combustion chamber pressure and temperature. Since the present invention assures combustion of the fuel upon injection, it becomes possible to regulate the rate of injection so that the temperature and pressure inside the combustion chamber will be kept below the threshold above which NOx is formed.

How this is achieved can be visualized by a graph of the relationship between piston position during its power stroke and the pressure inside the combustion chamber of an un-modified diesel engine versus the graph made by the same engine after it has been equipped with the present invention. The curve produced by the un-modified engine would show the pressure rise inside as the piston approached top dead center followed by a sharp rise occurring as the fuel is being injected into the combustion chamber. Shortly after all of the fuel has been injected, the pressure will reach its peak after which it will start dropping off. It is during this period of high pressure that oxides of nitrogen (NOx) are formed. An even more precipitous drop in combustion chamber pressure will follow this once the flame goes out as the piston travels past the first third of its travel down during the power stroke. Any fuel that has not been fully combusted by this time will go out the exhaust as smoke.

In contrast, the same engine equipped with the present invention will have all of the fuel injected into the combustion chamber ignited as it is being injected regardless of the injection timing and rate or the combustion chamber temperature and pressure. Because of this, during the power stroke, the pressure and temperature inside the combustion chamber can be controlled so that it is maintained at a level that is just below the threshold at which NOx is formed for as long as necessary to deliver the power needed. This will create a flat pressure "curve" for much of the power stroke of an engine equipped with an engine management computer that is controlling the timing and rate of fuel injection in conjunction with the present invention assuring the timely and complete combustion of the fuel.

When the two piston position to pressure curves are compared, the engine equipped with the present invention will have a lower peak pressure while maintaining an equal or greater area under the curve. This area under the pressure curve, not the peak pressure, relates directly to the power produced. Any engine tuning arrangement is a compromise between power, fuel economy, and pollutant emissions control with the present invention offering the engine designer unprecedented flexibility for achieving improvements in all areas of performance.

Ruman et al. (U.S. Pat. No. 5,924,404) discloses an engine management system for use in 2-cycle direct injected spark ignited gasoline fueled engines. An arrangement of a fuel injector and a conventional spark plug inside the combustion chamber which enables a 2-cycle engine to reduce its emissions and improve its fuel economy dramatically is disclosed. This control system could be adapted into the present invention by incorporating the appropriate software. It is also possible to adapt this control system for use in a 4-cycle reciprocating internal combustion engine.

Another object of the present invention is to enhance engine life for reciprocating internal combustion engines. Greater engine durability is the result of lower NOx emissions and lower peak pressures inside the combustion chamber. When NOx is created during the combustion process, this NOx reacts with the water naturally created by the combustion to create nitric acid. This nitric acid accelerates engine wear, but if nitric acid production during the combustion process is greatly reduced, engine durability is enhanced. Reducing the peak pressure within the combustion chamber during the power stroke has the effect of lowering the peak loads upon the engine bearings, further enhancing durability of the engine.

It is a further object of the present invention to make it possible to retrofit existing reciprocating direct injected internal combustion engines with the present invention at a minimum of expense and time. The present invention can be installed on most diesel engines in current use by removal of the cylinder head, installing injector/igniter assemblies on that cylinder head, reinstalling the modified original cylinder head, and then installing the electronics that go with it. In most cases it will not be necessary to either remove the entire engine from where it has been installed or completely replace the existing cylinder head. The importance of this retrofit application of the present invention to reciprocating 2-cycle and 4-cycle diesel engines cannot be overstated. The environmental and economic benefits made possible by the present invention are expanded dramatically as a result of it being possible to retrofit existing engines. Reciprocating internal combustion engines retrofitted with the present invention should benefit from all of the advantages that are possible, with the exception of engine weight reduction.

It is also another object of present invention to make it possible to design diesel fueled reciprocating internal combustion engines that weigh less for a given power output. Engine weight in new diesel engines designed and produced with the present invention incorporated into them can be designed to weigh much less for a given power output.

This is possible as a result of the lower peak combustion chamber pressures that occur in a reciprocating direct injected internal combustion engine, such as a diesel engine, that has the present invention incorporated into it. Diesel engines currently being manufactured have to be designed to deal with very high peak pressures inside of the combustion chamber that are necessary for heat-of-compression ignition to work. These very high peak pressures are also responsible for the creation of NOx. Because lower peak pressures inside the combustion chamber will occur in a diesel engine equipped with the present invention, the engine block will be subjected to lower peak stresses making it possible to design the engine to weigh less for a given engine displacement and power output.

These objects of the present invention are accomplished by creating an area of electrical ionization in front of or in close proximity to the nozzles of the fuel injectors. When fuel is injected into the combustion chamber, it must pass through or next to this area of electrical ionization. By having this take place, combustion is initiated for all of the injected fuel as it enters the combustion chamber of any kind of internal combustion engine. This area of electrical ionization will be maintained as long as necessary to sustain the combustion process. In the case of gas turbines, the Ring-of-Fire will be kept on continuously until the engine has warmed up to the point that the engine has reached an operating temperature at which combustion will be maintained on its own. When used in the combustion chamber of reciprocating type engines, the Ring-of-Fire will be kept going during the power stroke until the combustion process has been completed.

To do this, there are a number of electrodes placed so that their tips define a polygon inside the combustion chamber that is in front of the nozzle of the fuel injector. When this polygon defined by the electrode tips is energized electrically, it creates an area of electrical ionization also called the Ring-of-Fire. This Ring-of-Fire will ionize anything inside of it or in close proximity to it. For a pintle type fuel injector, the spray pattern of the fuel being injected into the combustion chamber will for the most part, pass through the area of electrical ionization defined by the polygon between the electrode tips. For a hole type fuel injector, the spray pattern of the fuel being injected is in such close proximity to the Ring-of-Fire that the fuel entering the combustion chamber will be ignited by this Ring-of-Fire.

These electrodes are held in position by a ceramic sleeve that surrounds the barrel of the fuel injector and extends from the combustion chamber through the cylinder head with the electrode wires embedded inside it. The other end of the wires that are embedded in the ceramic sleeve are connected to a set of spark plug type high voltage wires that are in turn connected to a high voltage electrical discharge source. There are a wide variety of high voltage electrical discharge sources that could be used by having them integrated into the circuitry that creates the Ring-of-Fire.

R. S. Warner developed a system that could be easily integrated into the Ring-of-Fire high voltage electrical discharge circuitry. This system was known as the Pulse-Tronic 1000 ignition unit and R. S. Warner presented a research paper about it to the Diesel & Gas Engine Power Division of the American Society of Mechanical Engineers during the ASME Diesel & Gas Engine Power Conference and Exhibit held in Dallas, Tex. in April, 1970.

An interesting feature of this system is its output of a train of pulses used to initiate and maintain the combustion process inside the combustion chamber. The Pulse-Tronic 1000 ignition unit was shown to be capable of successfully burning fuel air mixtures that were much leaner than what could be ignited by conventional ignition systems. Lean fuel air mixtures are notoriously hard to ignite and keep burning and the fact that this unit could successfully do so indicates the general superiority of this ignition system.

Although applied only to gasoline engines, this system may be used as the high voltage electrical discharge source for the Ring-of-Fire circuit in the present invention. The Pulse-Tronic 1000 ignition unit is self-contained and powered by mechanical energy from the motor via a fan belt or rotating shaft without the need of a connection to a battery or other electrical power source.

Rich (U.S. Pat. No. 5,429,103) also discloses a means of producing a high voltage output with a waveform almost the same as the Pulse-Tronic 1000 ignition unit developed by R. S. Warner. The Rich patent high performance ignition system is able to initiate and maintain combustion of lean fuel air mixtures that are difficult to burn in engines that were equipped with it.

The high voltage electrical discharge circuitry that is used in the preferred embodiment as realized in the operational prototype creates a ball of plasma located directly in front of the nozzle of the fuel injector. This ball of plasma is remarkably effective at insuring complete combustion of all of the fuel injected through it.

None of the examples disclosed in the prior art propose a means of creating an area of thorough electrical ionization in the combustion chamber and locating it so that all of the fuel being injected into the combustion chamber must pass in close proximity or through the area of electrical ionization.

In the case of the present invention being applied to diesel engines, eliminating the dependency of the engine upon the heat of compression for the initiation and maintenance of the combustion process makes it is possible to achieve real-time control of the complete combustion process. This gives the engine designer unprecedented flexibility in tuning the engine to achieve what is needed for any given application, be it fuel economy, power, or low pollutant emissions.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIG. 5A is an enlarged side view of the injector/igniter apparatus with the Ring-of-Fire shown in operation and with fuel being injected by a pintle type of fuel injector.

FIG. 5B is an enlarged bottom view of the injector/igniter apparatus with the Ring-of-Fire shown in operation and with fuel being injected by a pintle type of fuel injector.

FIG. 5C is an enlarged side view of the injector/igniter apparatus rotated by 90 degrees from the view presented in FIG. 5A with the Ring-of-Fire shown in operation and with fuel being injected by a pintle type of fuel injector.

FIG. 5D is an enlarged perspective view of the injector/igniter apparatus with the Ring-of-Fire shown in operation and with fuel being injected by a pintle type of fuel injector.

FIG. 6A is an enlarged side view of the injector/igniter apparatus with the Ring-of-Fire shown in operation and with fuel being injected by a hole type of fuel injector.

FIG. 6B is an enlarged bottom view of the injector/igniter apparatus with the Ring-of-Fire shown in operation and with fuel being injected by a hole type of fuel injector.

FIG. 6C is an enlarged side view of the injector/igniter apparatus rotated by 90 degrees from the view presented in FIG. 6A with the Ring-of-Fire shown in operation and with fuel being injected by a hole type of fuel injector.

FIG. 6D is an enlarged perspective view of the injector/igniter apparatus with the Ring-of-Fire shown in operation and with fuel being injected by a hole type of fuel injector.

FIG. 9 is a block diagram of the signal generation circuit portion of the present invention.

DETAILED DESCRIPTION OF THE PREFERRED EMBODIMENTS

The invention will now be described in further detail in connection with illustrative preferred embodiments for improving combustion in a direct injected internal combustion engine enabling the engine to achieve better fuel economy, reduced pollutant emissions, and more power. Within the scope of the present invention, this system could be applied to gas turbines and to reciprocating internal combustion engines that are direct injected of either the 2-stroke or the 4-stroke type that have been designed for use with any type of combustible fuel including gasoline, diesel or jet fuel.

Figure 1:
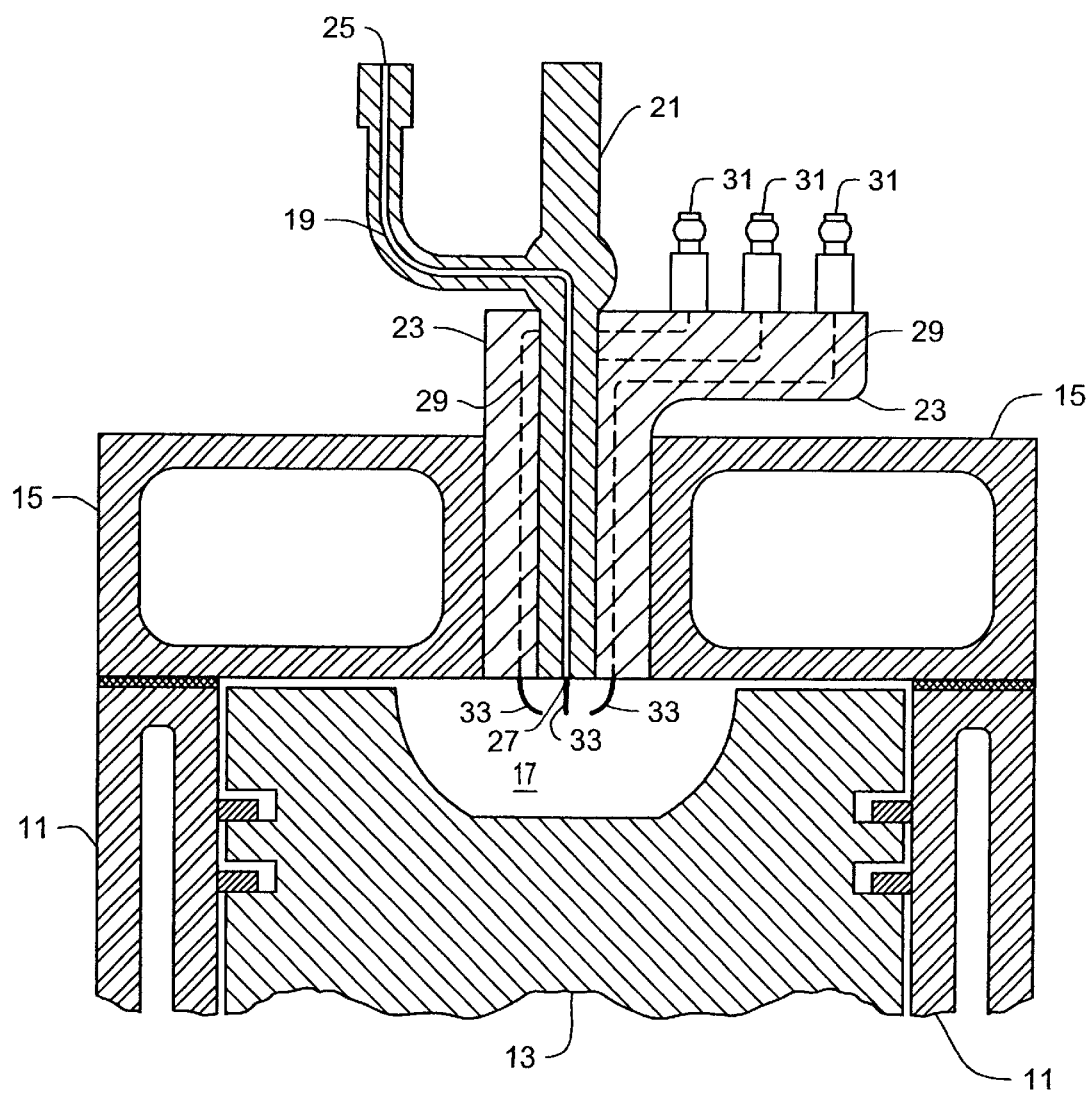
FIG. 1 is a cross sectional side view of the injector/igniter apparatus of the present invention installed in an engine cylinder head.

Referring to FIG. 1, the present invention is shown mounted in a cylinder head 15 of a diesel engine. An engine block 11 has placed inside it a piston 13 and mounted on top of the engine block 11 is the cylinder head 15. A combustion chamber 17 is located inside the area surrounded by the engine block 11, the piston 13, and the cylinder head 15. Passing through the cylinder head 15 is a fuel injector 21 that has its lower body surrounded by a ceramic sleeve 23. A fuel inlet 25 attached to the upper portion of the fuel injector 21 has a fuel passageway 19 that allows fuel to travel to a fuel injection nozzle 27. This fuel injection nozzle 27 protrudes into the inside of the combustion chamber 17.

A plurality of embedded wires 29 travel from high voltage terminals 31 mounted on the ceramic sleeve 23 outside and above the cylinder head 15 through the length of the ceramic sleeve 23 including substantially parallel to the lower portion of the fuel injector 21. These embedded wires 29 extend into the combustion chamber 17 as electrodes 33. In this embodiment, there are six electrodes 33 arrayed around and below the fuel injector nozzle 27 inside the combustion chamber 17. All six electrodes 33 are individually connected to high voltage terminals 31 by their own embedded wire 29.

Figure 2:
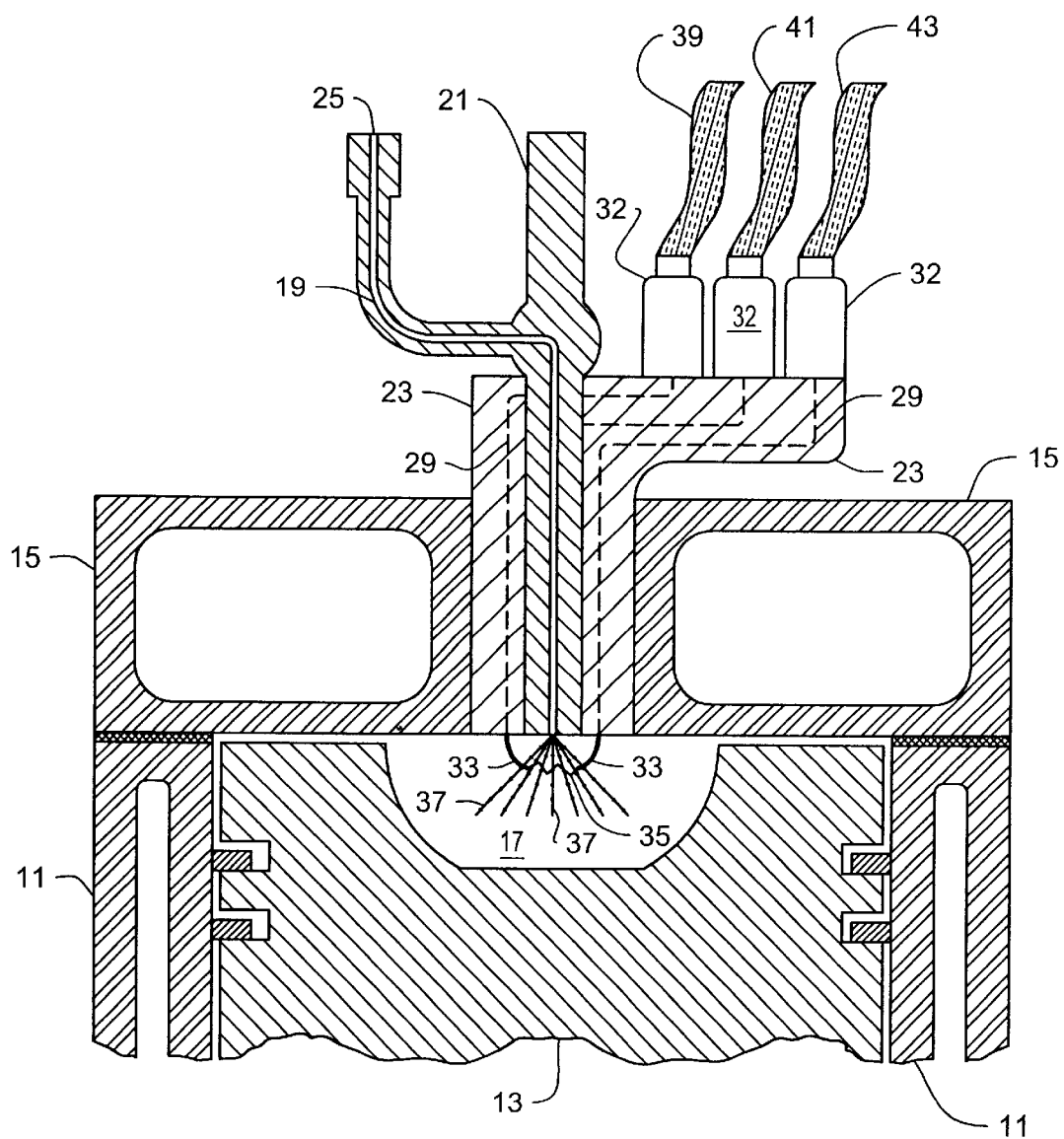
FIG. 2 is a cross sectional side view of the injector/igniter apparatus of the present invention installed in an engine cylinder head with fuel being injected into the combustion chamber.

Referring to FIG. 2, pressurized fuel is shown entering the fuel injector 21 through the fuel inlet 25, down fuel passageway 19, and then out of the fuel injector nozzle 27 into the combustion chamber 17 producing a fuel injection spray pattern 37. While this is happening, a high voltage discharge 35 occurs between all of the tips of the six electrodes 33 inside the combustion chamber 17, with the fuel injection spray pattern 37 passing right next to, or through the high voltage discharge 35. The power for the high voltage discharge 35 that occurs between the six electrodes 33 is produced by a set of six high voltage discharge circuits 51, 53, 55, 57, 59 and 61 (discussed in detail with reference to FIGS. 11 and 12).

A set of six spark plug type high voltage wires 39, 41, 43, 45, 47 and 49 connects on one end to the set of six high voltage discharge circuits 51, 53, 55, 57, 59 and 61. The other end of the set of six spark plug type high voltage wires 39, 41, 43, 45, 47 and 49 have an externally insulated connector 32 that secures and protects the connection to the six high voltage terminals 31 mounted on the upper portion of the ceramic sleeve 23. This set of six high voltage discharge circuits 51, 53, 55, 57, 59 and 61 is controlled by a signal generation circuit 63 which has its position in the system discussed in connection with FIG. 12 and has its operation discussed in detail in connection with FIG. 9.

Figure 3D:
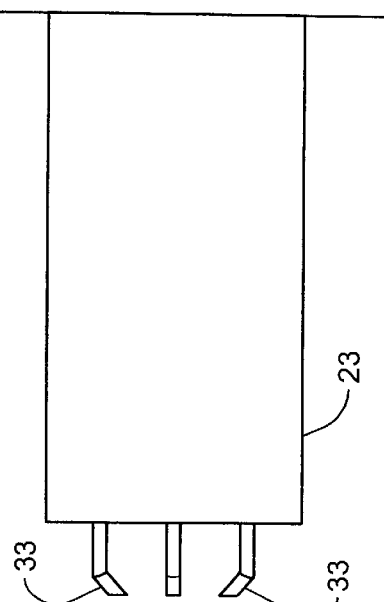
FIG. 3D is an enlarged perspective view of the injector/igniter apparatus.
Figure 3C:
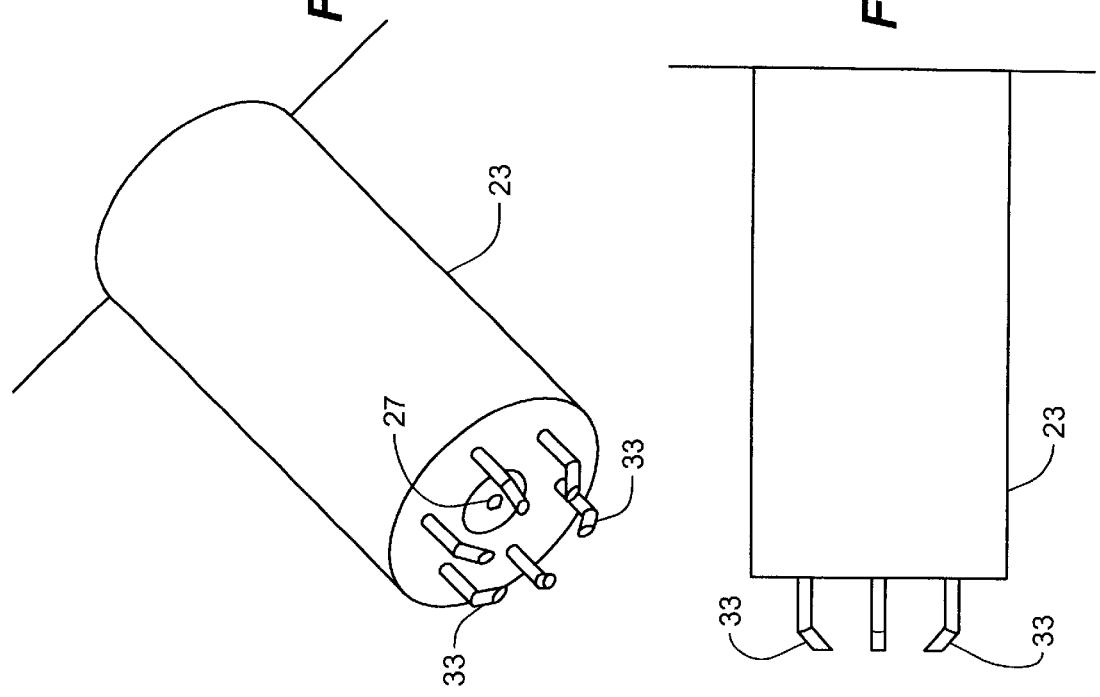
FIG. 3C is an enlarged side view of the injector/igniter apparatus rotated by 90 degrees from the view presented in FIG. 3A.
Figure 3A:
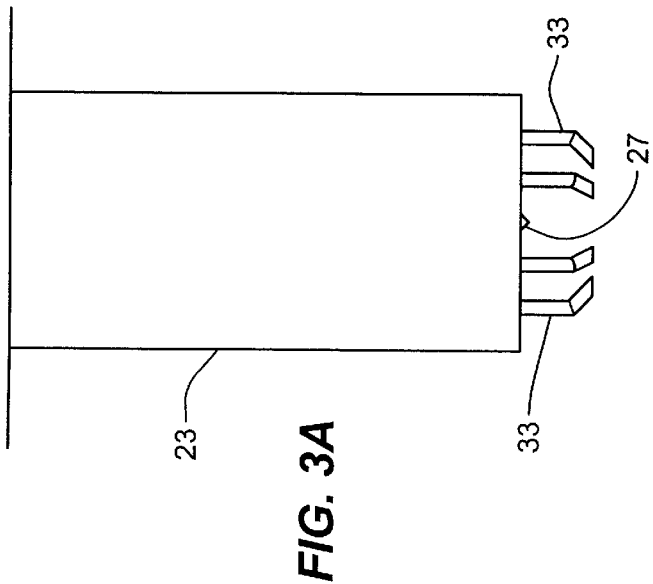
FIG. 3A is an enlarged side view of the lower end of the injector/igniter apparatus that extends through the cylinder head.

FIG. 3A is a side view of the lower portion of the ceramic sleeve 23 that extends through the cylinder head 15 into the combustion chamber 17. The fuel injection nozzle 27 at the end of the fuel injector 21 and electrodes 33 are on the end of the ceramic sleeve 23 that faces into the combustion chamber 17.

Figure 3B:
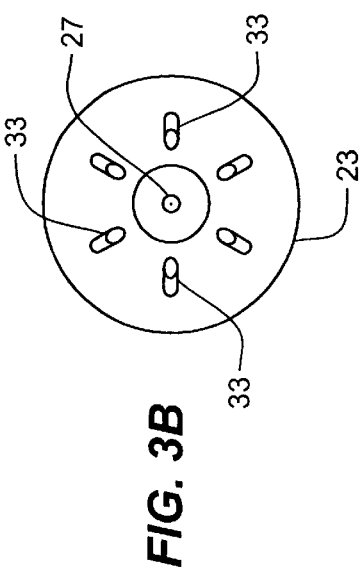
FIG. 3B is an enlarged bottom view of the injector/igniter apparatus.

FIG. 3B shows the only part of the present invention that is actually exposed to the inside of the combustion chamber 17. The six electrodes 33 are arranged in a circular manner around the fuel injection nozzle 27.

FIG. 3C shows the same piece of the present invention that is illustrated by FIG. 3A with the difference being that the image was rotated by 90 degrees in order to clarify the shape and position of the electrodes 33 on the end of the ceramic sleeve 23.

An oblique perspective of the lower portion of the ceramic sleeve 23 further illustrates the placement relationship of the fuel injector nozzle 27 to the electrodes 33 in FIG. 3D.

Figure 4D:
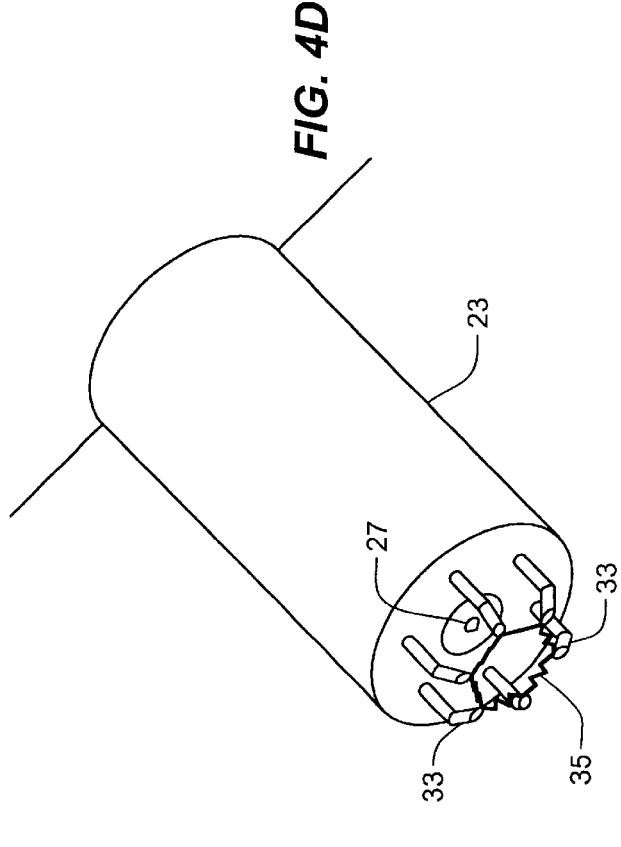
FIG. 4D is an enlarged perspective view of the injector/igniter apparatus with the Ring-of-Fire shown in operation.
Figure 4C:
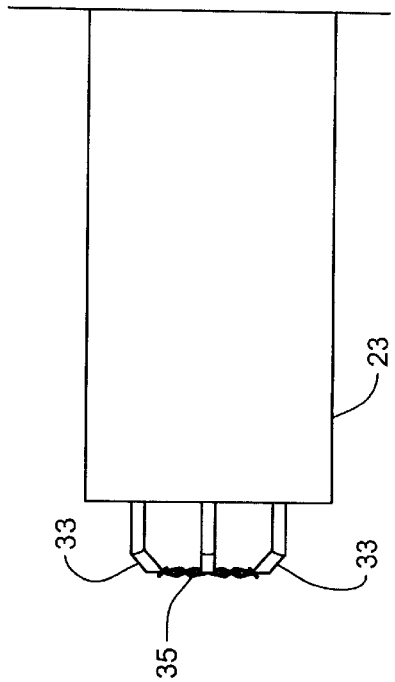
FIG. 4C is an enlarged side view of the injector/igniter apparatus rotated by 90 degrees from the view presented in FIG. 4A.
Figure 4A:
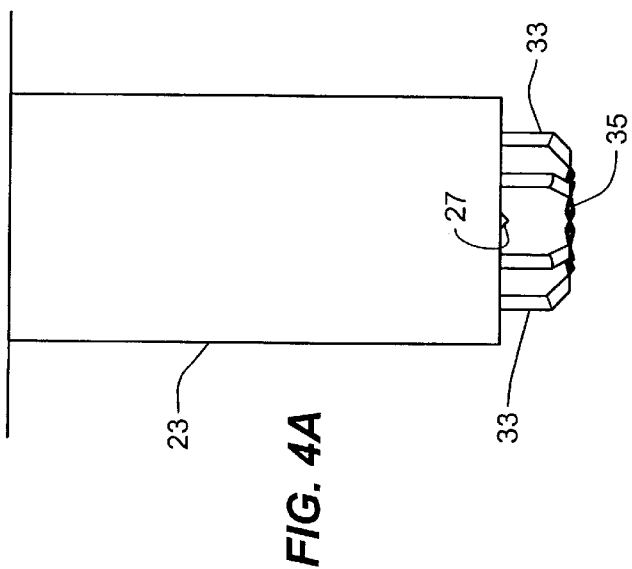
FIG. 4A is an enlarged side view of the injector/igniter apparatus with the Ring-of-Fire shown in operation.
Figure 4B:
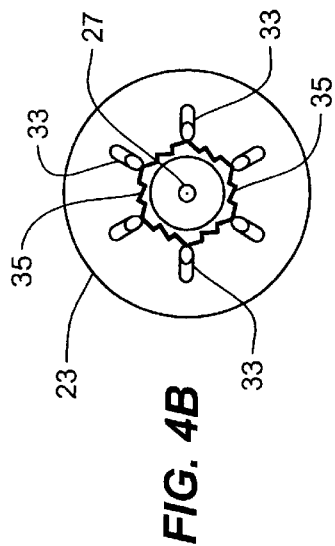
FIG. 4B is an enlarged bottom view of the injector/igniter apparatus with the Ring-of-Fire shown in operation.

FIGS. 4A, 4B and 4C provide the same set of views as FIGS. 3A, 3B and 3C the inclusion of the operation of the high voltage discharge 35. This gives further clarification of the placement of the high voltage discharge 35 upon the electrodes 33 that are arrayed around the fuel injector nozzle 27 on the end of the ceramic sleeve 23 that faces the combustion chamber 17. This combustion chamber 17 could, within the scope of the present invention, be installed in any of a variety of engine types to include gas turbines as well as reciprocating 2-cycle and 4-cycle diesel or gasoline direct injected internal combustion engines.

FIG. 4D also shows the same oblique perspective view of the lower portion of the ceramic sleeve 23 as shown in FIG. 3D with the inclusion of the high voltage discharge 35 occurring between the six electrodes 33. Other numbers of electrodes to create the Ring-of-Fire are possible. Also, the Ring-of-Fire is schematically illustrated in these figures since it is difficult to illustrate completely.

FIGS. 5A, 5B, 5C and 5D show the lower portion of the ceramic sleeve 23 as shown in FIGS. 4A, 4B, 4C and 4D with the inclusion of fuel being injected by a fuel injector 21. The fuel injection spray pattern 37 of a pintle type of the fuel injector nozzle 27 places a cone of injected fuel centered to the high voltage discharge 35 that occurs between the electrodes 33 inside the combustion chamber 17. This insures complete combustion initiation of all of the fuel as it is injected.

FIGS. 6A, 6B, 6C and 6D show the lower portion of the ceramic sleeve 23 as shown in FIGS. 5A, 5B, SC and 5D. The difference is that this time the fuel injector 21 has a fuel injector nozzle 27 of the hole type. The hole type fuel injector nozzle 27 produces a fuel injection spray pattern 37 that has a set of lobes. Each lobe sprays directly next to or through the high voltage discharge 35 thus insuring complete combustion initiation of all of the fuel as it is injected into the combustion chamber 17.

Figure 7A:
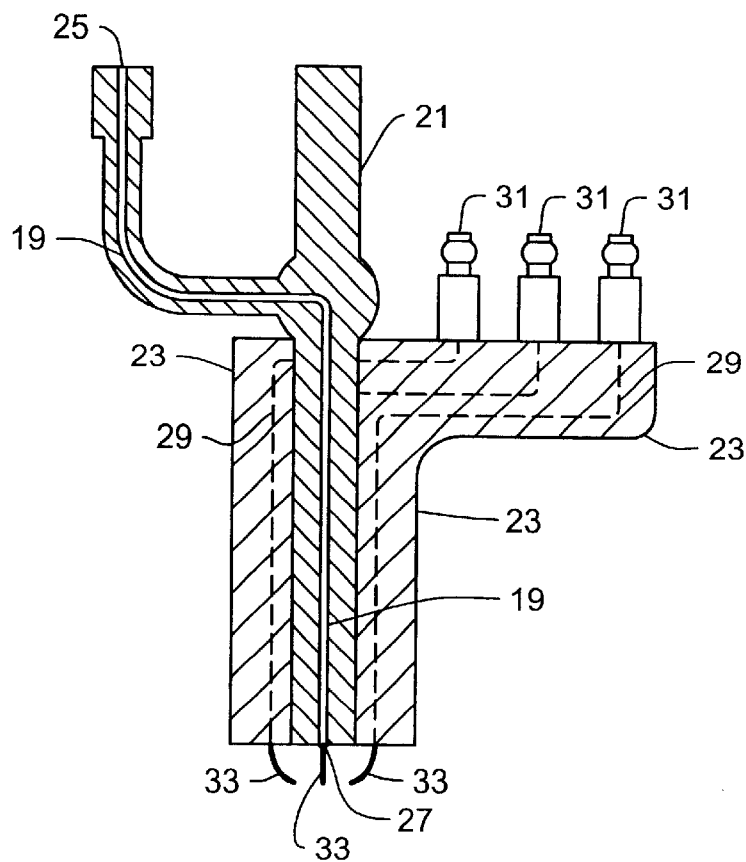
FIG. 7A is a cross sectional side view of the injector/igniter apparatus of the present invention.

Referring to FIG. 7A, the fuel injector 21 is installed inside the ceramic sleeve 23. When fuel injection is taking place, a fuel injector pump (not shown) sends pressurized fuel to the fuel inlet 25 of the fuel injector 21 in a manner known in the art. The pressurized fuel travels through fuel passageway 19 to the fuel injector nozzle 27 that injects the fuel into the combustion chamber 17. The ceramic sleeve 23 surrounds the lower portion of the fuel injector 21.

The upper end of the ceramic sleeve 23 that is above the cylinder head 15 has six high voltage terminals 31 that are connected to six embedded wires 29 that extend from the top to the bottom of the ceramic sleeve 23. The lower ends of the six embedded wires 29 extend from the bottom of the ceramic sleeve 23 into the combustion chamber 17 as six electrodes 33. These six electrodes 33 are positioned such that their tips are arranged so that they define a hexagon inside the combustion chamber 17 around and below the fuel injector nozzle 27. This placement is important to insure that the fuel injection spray pattern 37 from the fuel injector nozzle 27 must pass in close proximity to or through the high voltage discharge 35 that occurs between the tips of the electrodes 33.

Figure 7B:
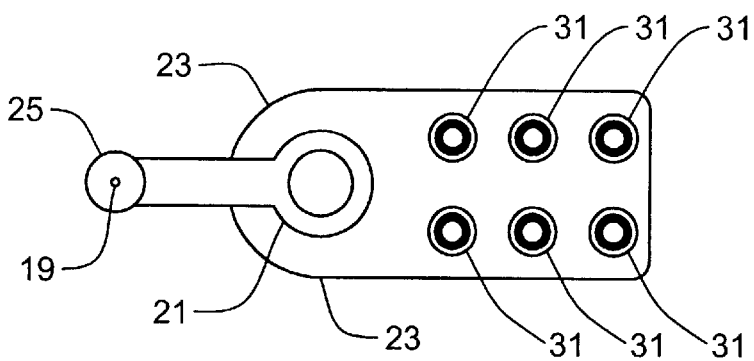
FIG. 7B is a top view of the injector/igniter apparatus of the present invention.

FIG. 7B shows a top view of the fuel injector 21 mounted through the ceramic sleeve 23 with the placement of the six high voltage terminals 31 clearly shown.

Figure 7C:
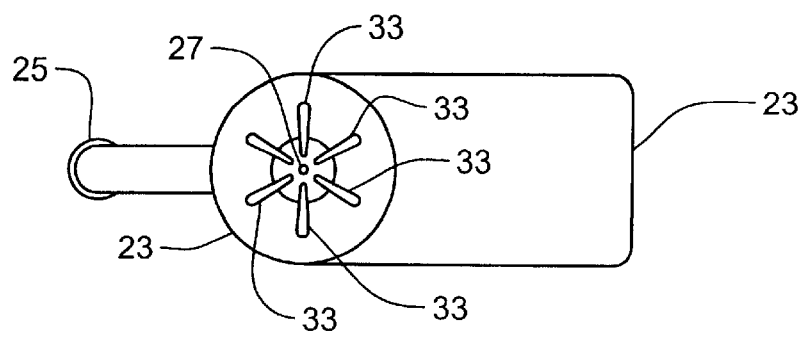
FIG. 7C is a bottom view of the injector/igniter apparatus of the present invention.

FIG. 7C is a view from the combustion chamber 17 looking up at the face of the ceramic sleeve 23 and at the tip of the fuel injector 21 with the fuel injection nozzle 27 in the center of the six electrodes 33.

Figure 8A:
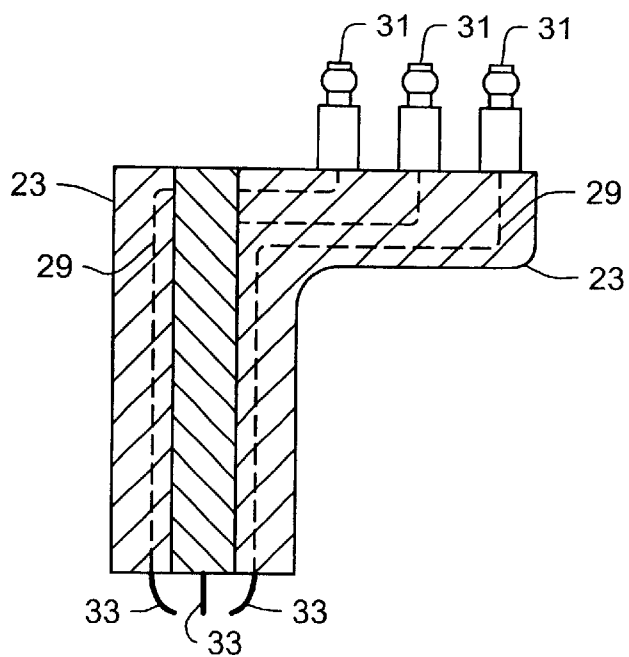
FIG. 8A is a cross sectional side view of the ceramic sleeve portion of the injector/igniter apparatus of the present invention.
Figure 8B:
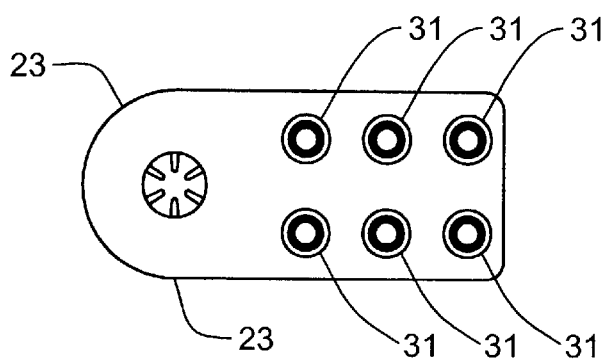
FIG. 8B is a top view of the ceramic sleeve portion of the injector/igniter apparatus of the present invention.
Figure 8C:
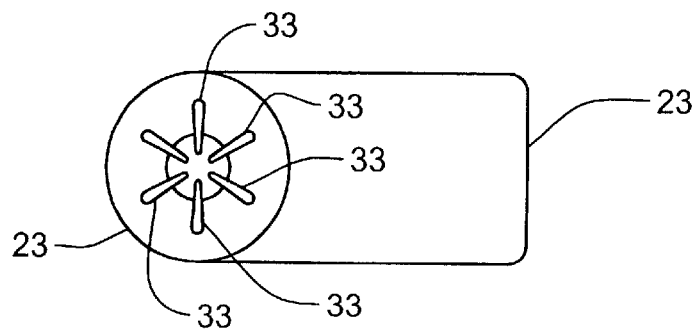
FIG. 8C is a bottom view drawing of the ceramic sleeve portion of the injector/igniter apparatus of the present invention.

FIGS. 8A, 8B and 8C are similar views as FIGS. 7A, 7B and 7C without the fuel injector 21 being shown to further clarify the positions of the high voltage terminals 31, the embedded wires 29 and the electrodes 33.

Figure 10A:
FIG. 10A is a timing signal diagram of the square-wave signal created by the square-wave generator in the signal generation circuit of the present invention.

FIG. 9 shows the signal generation circuit 63 in detail. The signal generation circuit 63 controls the high voltage generation circuits 51, 52, 53, 55, 57, 59 and 61. The signals mentioned in this discussion are shown in detail by FIGS. 10A, 10B and 10C.

The signal generation circuit 63 has its overall output controlled by an engine timing signal source 65 that turns it on and off through an engine timing signal transmission line 67. The engine timing signal source 65 controls the signal generation circuit 63 so that at the appropriate time, at or before fuel injection is to take place, the high voltage discharge 35 is initiated. The engine timing signal source 65 keeps the high voltage discharge 35 going for as long as necessary to ensure complete combustion of all of the fuel and air mixture inside the combustion chamber 17.

The signal generation circuit 63 has within it a square-wave generator circuit 69 that sends through a square-wave signal transmission line 71, a square-wave signal 73 to a signal divider circuit 75. The square-wave generator circuit 63 is based on a 555 timer integrated circuit set up to operate as an astable multi-vibrator circuit producing a square-wave signal between 0 and 5 volts at a frequency between 5 and 30 kilo-hertz.

Figure 10B:
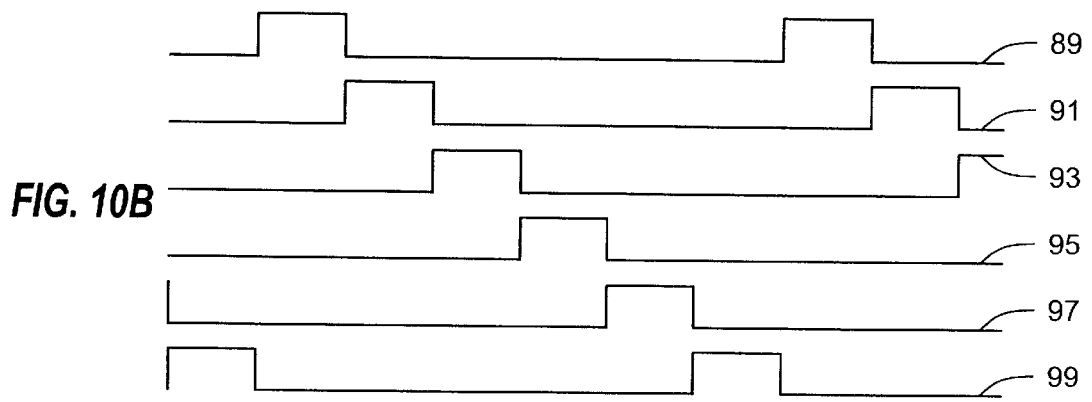
FIG. 10B is a timing signal diagram of the six sequential signals created by the signal divider circuit in the signal generation circuit of the present invention.

The signal divider circuit 75 divides the square-wave signal 73 into a set of six sequential signals 89, 91, 93, 95, 97 and 99, as shown in FIG. 10B, that are sent through a set of six sequential signal transmission lines 77, 79, 81, 83, 85 and 87 to a signal overlap circuit 101. The signal divider circuit 75 that divides the square-wave signal 73 into a set of six sequential signals 89, 91, 93, 95, 97 and 99 is based on the 4017 decade counter integrated circuit.

Figure 10C:
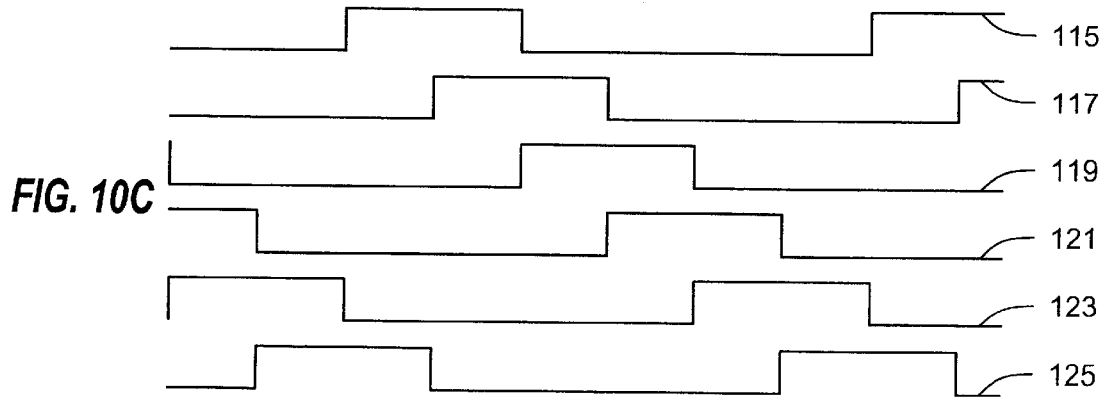
FIG. 10C is a timing signal diagram of the six overlapped sequential signals created by the signal overlap circuit in the signal generation circuit of the present invention.

The signal overlap circuit 101 in turn generates a set of six overlapped sequential signals 115, 117, 119, 121, 123 and 125, as shown in FIG. 10C, and then sends these signals through a set of six overlapped sequential signal lines 103, 105, 107, 109, 111 and 113 to a signal line driver circuit 127. The signal overlap circuit 101 uses a bank of twelve 1N4004 diodes to generate the set of six overlapped sequential signals 115, 117, 119, 121, 123 and 125 shown in FIG. 10C.

The signal line driver circuit 127 is activated only when the enable signal from the engine timing signal source 65, brought in by the engine timing signal transmission line 67 and it allows the set of six overlapped sequential signals 115, 117, 119, 121, 123 and 125 to go through the signal line driver circuit 127. The signal line driver circuit 127 uses a 74HCT541 integrated circuit to act as a "gate" to the set of six overlapped sequential signals 115, 117, 119, 121, 123 and 125.

It is within the scope of the present invention to have this engine timing signal source 65 be as simple as a cam-shaft position sensor, such as a Hall-effect sensor, or as complicated as a highly sophisticated engine management computer responding in real time to a number of factors to include actual conditions inside of the combustion chamber 17 as they happen in real time as is known in the art. When enabled by the engine timing signal source 65, the signal line driver circuit 127 then "cleans up" and strengthens the set of six overlapped sequential signals 115, 117, 119, 121, 123 and 125 without otherwise changing them before they are sent out through a set of six control signal output lines 129, 131, 133, 135, 137 and 139 to each of the six high voltage discharge circuits 51, 53, 55, 57, 59 and 61.

Figure 11:
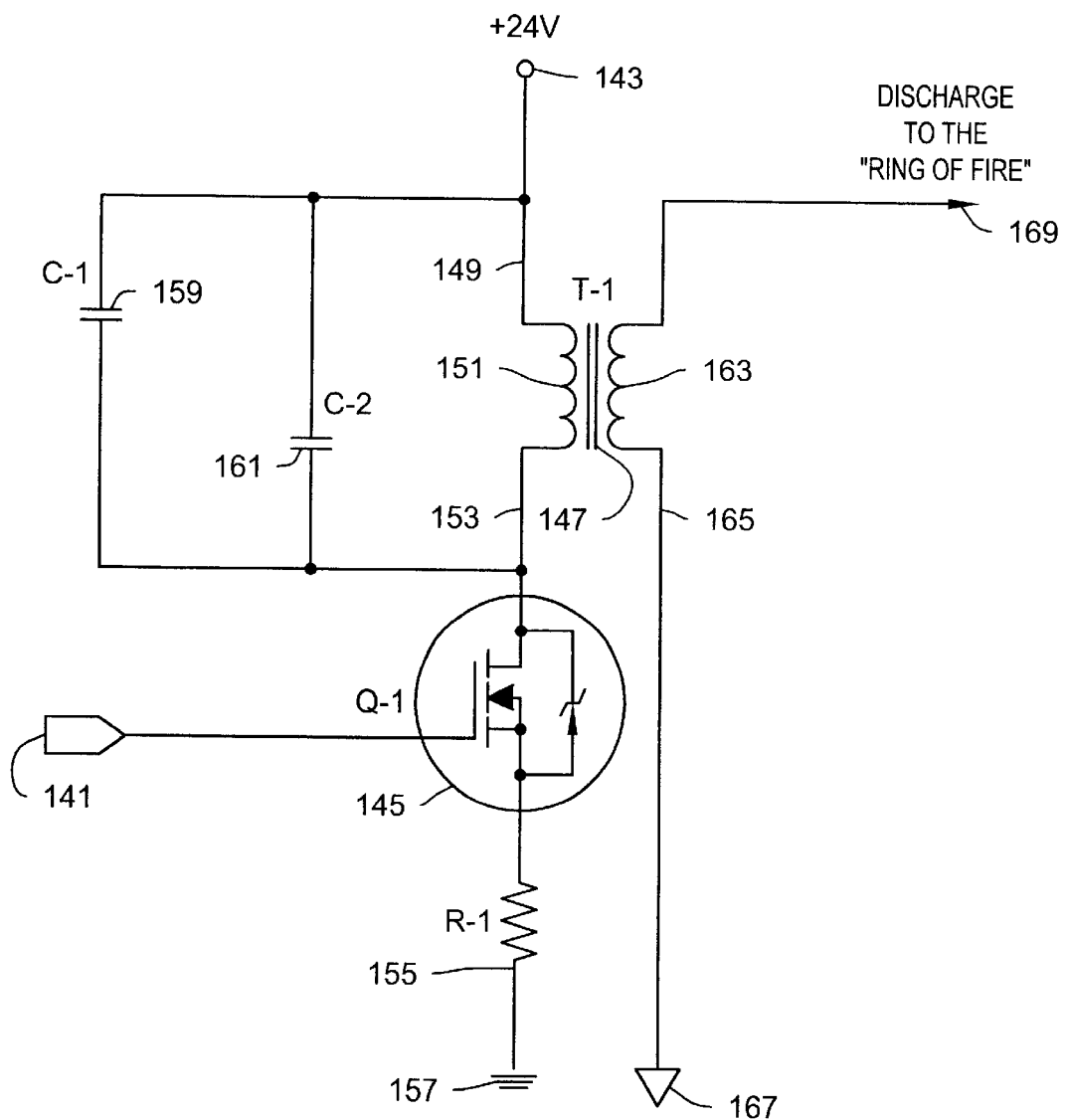
FIG. 11 is a schematic of one of the high voltage discharge circuits of the present invention.

FIG. 11 is an electrical schematic for each high voltage discharge circuit 51, 53, 55, 57, 59 and 61. Each of the six high voltage discharge circuits 51, 53, 55, 57, 59 and 61 is connected to a 24 volt power source 143 and to one of the six control signal output lines 129, 131, 133, 135, 137 and 139. When a signal is received by its intended high voltage discharge circuit 51, 53, 55, 57, 59 and 61 it turns on a power MOSFET 145 labeled Q-1. In one embodiment of the present invention, the power MOSFET (Metal Oxide Surface Effect Transistor) 145 labeled Q-1 is a MTY55N20E made by Motorola and it is rated for 55 amps at 200 volts.

When the power MOSFET 145 labeled Q-1 is turned on, a high voltage transformer 147 labeled T-1 then has current flow from the 24 volt power source 143 through a primary winding power lead 149. The current passes through a primary winding 151 of the high voltage transformer 147 labeled T-1, through a primary winding ground lead 153, through the power MOSFET 145 labeled Q-1, through a resistor 155 labeled R-1 that is rated at 0.2 ohms and 10 watts, and then finally to a low voltage ground connection 157. This low voltage ground connection 157 is shared by all of the six high voltage discharge circuits 51, 53, 55, 57, 59 and 61 and it is also used by all of the components of the signal generation circuit 63. There is a large value capacitor 159 labeled C-1 which is rated at 1 microfarad and a small value capacitor 161 labeled C-2 which is rated at 0.01 microfarads. Both are attached in parallel across the primary winding power lead 149 and the primary winding ground lead 153.

An electrically isolated secondary winding 163 of the high voltage transformer 147 labeled T-1 has an electrically isolated secondary winding ground lead 165 connected to an electrically isolated "floating" high voltage ground 167 that is shared in the same position of each circuit in all of the six high voltage discharge circuits 51, 53, 55, 57, 59 and 61. The electrically isolated secondary winding 163 of the high voltage transformer 147 labeled T-1 is connected to an electrically isolated secondary winding high voltage output lead 169. The electrically isolated secondary winding high voltage output lead 169 is in turn connected to the appropriate one of the set of six spark plug type high voltage wires 39, 41, 43, 45, 47 and 49 which in turn are connected to one of the set of six high voltage terminals 31 on the ceramic sleeve 23.

Figure 12:
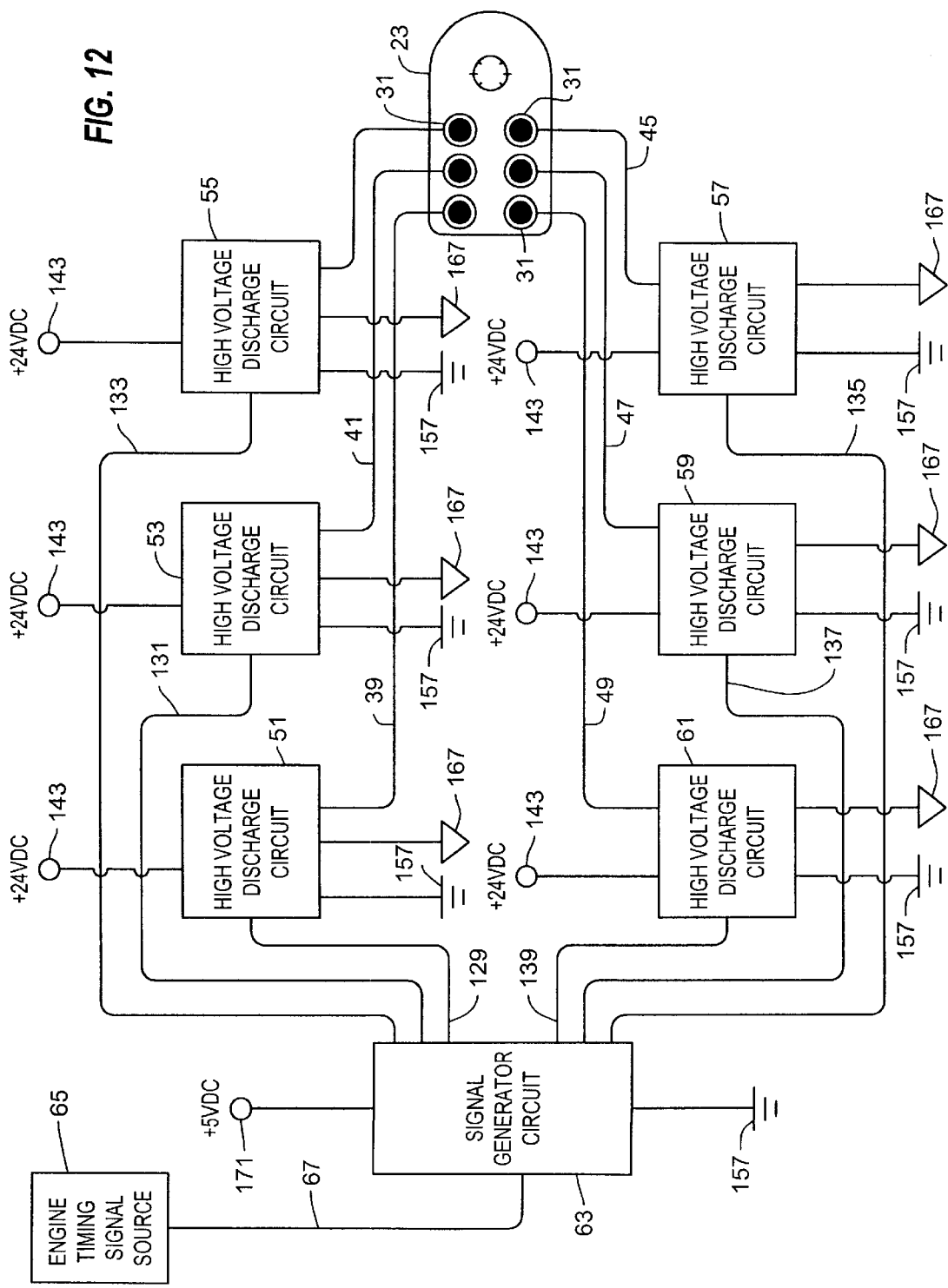
FIG. 12 is a diagram depicting all six high voltage discharge circuits attached to the ceramic sleeve portion of the injector/igniter apparatus of the present invention.

FIG. 12 shows the overall combination of elements of the electrical system according to the present invention. This includes a 5 volt power source 171 used by all of the circuitry inside the signal generation circuit 63. Further a low voltage ground connection 157 is shown as being shared by all of the high voltage discharge circuits 51, 53, 55, 57, 59 and 61 and with the signal generation circuit 63.

It should be appreciated that the other ways of creating and controlling the Ring-of-Fire high voltage discharge 35. Although any means of creating and controlling the Ring-of-Fire must place it so that the injected fuel spray pattern 37 go next to or through it as fuel enters the combustion chamber 17.

What is claimed is:

1. An ignition device, comprising:
at least three electrodes having electrode tips, said electrode tips being disposed in at least one of a combustion chamber and a pre-combustion chamber, said electrode tips being arranged to define a polygonal area disposed in close proximity to a location where fuel is injected;
a source of electrical energy that supplies said electrodes with power, said electrode tips being arranged so that when electrical power is supplied directly to each electrode tip, an area of electrical ionization zone is formed; and
a timing circuit for allowing the source of electrical energy to sequentially supply power to each electrode, wherein said timing circuit includes a signal overlap circuit for allowing at least two electrodes to be supplied with power during a predetermined amount of time.

2. An ignition device as defined in claim 1, wherein said source of electrical energy further comprises at least two electrical power sources connected to at least two of said electrodes.

3. An ignition device as defined in claim 2, wherein said source of electrical energy further comprises at least one of said two electrical power sources is connected to each of said electrodes.

4. An ignition device as defined in claim 1, wherein said electrode tips include six electrode tips disposed around the location where fuel is injected.

5. An ignition device as defined in claim 1, further comprising an insulated sleeve, said electrodes being at least partially disposed in said insulated sleeve.

6. An ignition device as defined in claim 5, further comprising a fuel injector disposed inside said insulated sleeve.

7. An ignition device as defined in claim 1, wherein said electrode tips being arranged so that injected fuel must pass through as the polygonal area defined by said electrode tips.

8. An ignition device as defined in claim 1, further comprising at least three high voltage electrical sources, each of said electrical sources supplying power to one of said electrodes.

9. An ignition device as defined in claim 1, further comprising a ceramic sleeve that extends from said at least one of said combustion chamber and said pre-combustion chamber through a cylinder head, said ceramic sleeve including wires embedded therein forming said electrodes in said cylinder head, one end or said wires being connected to a set of terminals connected to said source of electrical power.

10. An ignition device as defined in claim 1, further comprising an engine management computer for controlling said timing circuit.

* * * * *